(12) United States Patent  (10) Patent No.: US 8,756,374 B2
Cypher et al.  (45) Date of Patent: Jun. 17, 2014

(54) STORE QUEUE SUPPORTING ORDERED AND UNORDERED STORES

(75) Inventors: Robert E. Cypher, Saratoga, CA (US); Haakan E. Zeffer, Lidingo (SE)

(73) Assignee: Oracle International Corporation, Redwood Shores, CA (US)

(*) Notice: Subject to any disclaimer, the term of this patent is extended or adjusted under 35 U.S.C. 154(b) by 784 days.

(21) Appl. No.: 12/940,929

(22) Filed: Nov. 5, 2010

(65) Prior Publication Data

US 2012/0117323 A1  May 10, 2012

(51) Int. Cl.
*G06F 12/00* (2006.01)
*G06F 12/08* (2006.01)

(52) U.S. Cl.
CPC .................... *G06F 12/0802* (2013.01)
USPC ............... 711/118; 711/E12.017; 712/216

(58) Field of Classification Search
CPC .................................................. G06F 12/0802
USPC ....................... 711/118, E12.017; 712/216
See application file for complete search history.

(56) References Cited

U.S. PATENT DOCUMENTS

2010/0125707 A1* 5/2010 Cypher et al. ................ 711/145
2010/0153655 A1* 6/2010 Cypher et al. ................ 711/139

* cited by examiner

*Primary Examiner* — Aracelis Ruiz
(74) *Attorney, Agent, or Firm* — Park, Vaughan, Fleming & Dowler LLP (57) ABSTRACT

Some described embodiments provide a system that performs stores in a memory system. During operation, the system receives a store for a first thread. The system then creates an entry for the store in a store queue for the first thread. While creating the entry, the system requests a store-mark for a cache line for the store, wherein the store-mark for the cache line indicates that one or more store queue entries are waiting to be committed to the cache line. The system then receives a response to the request for the store-mark, wherein the response indicates that the cache line for the store is store-marked. Upon receiving the response, the system updates a set of ordered records for the first thread by inserting data for the store in the set of ordered records, wherein the set of ordered records include store-marked stores for the first thread.

18 Claims, 7 Drawing Sheets

STORE QUEUE SUPPORTING ORDERED AND UNORDERED STORES

RELATED APPLICATIONS

The subject matter of this application is related to the subject matter in a co-pending application by the same inventors as the instant application, titled "Store Queue with Store-Merging and Forward-Progress Guarantees," having Ser. No. 12/335,019, and filing date 15 Dec. 2008.

The subject matter of this application is related to the subject matter in U.S. Pat. No. 7,757,044, titled "Facilitating Store Reordering Through Cacheline Marking," by inventors Robert E. Cypher and Shailender Chaudhry.

BACKGROUND

1. Field

The described embodiments relate to the design of processors within computer systems. More specifically, the described embodiments include a processor with a store queue that provides bounded-time responses to read-after-write (RAW) bypasses and forward-progress requests for threads.

2. Related Art

Advances in semiconductor fabrication technology have given rise to dramatic increases in microprocessor clock speeds. Unfortunately, this increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a load generates a cache miss, the subsequent access to level-two (L2) cache or memory can require dozens or hundreds of clock cycles to complete, during which time the processor is typically idle, performing no useful work. In contrast, cache misses during stores typically do not affect processor performance as much because the processor usually places the stores into a "store queue" and continues executing subsequent instructions. Existing store queue designs typically maintain an array of pending stores in program order.

Some existing store queue designs place a "store-mark" on a cache line to indicate that one or more store queue entries include pending stores that are to be committed to the cache line, and then delay accesses to the store-marked cache lines by other threads. In some of these designs, one or more of the pending stores can be directed to data-words in the same cache line. If consecutive stores are directed to data-words in the same cache line, these stores can be merged in the store queue without violating a conventional memory model, such as the Total-Store-Order (TSO) memory model. In this way, stores to a given cache line can be reordered, thereby allowing non-consecutive stores to be merged without violating TSO. This merging can reduce the memory bandwidth because the number of memory accesses is reduced.

When multiple threads are store-marking cache lines, some existing processors traverse a list of stores (e.g., the store queue) in order to respond to requests for cache lines by other threads, e.g., forward progress read-to-own (FPRTO) coherence requests and/or read-after-write (RAW) bypass requests. Traversing a list to locate data for stores can be time consuming.

SUMMARY

The described embodiments provide a system that performs stores in a memory system. During operation, the system receives a store for a first thread. The system then creates an entry for the store in a store queue for the first thread. While creating the entry, the system requests a store-mark for a cache line for the store, wherein the store-mark for the cache line indicates that one or more store queue entries are waiting to be committed to the cache line. The system then receives a response to the request for the store-mark, wherein the response indicates that the cache line for the store is store-marked. Upon receiving the response, the system updates a set of ordered records for the first thread by inserting data for the store in the set of ordered records, wherein the set of ordered records include store-marked stores for the first thread.

In some embodiments, while creating the entry for the store in the store queue, if the cache line for the store is not store-marked, the system updates a set of unordered records for the first thread by inserting data for the store in the set of unordered records, wherein the set of unordered records includes stores for the first thread for which corresponding cache lines are not store-marked.

In some embodiments, while inserting data for the store in the set of ordered records, if the ordered records include data from a previous store corresponding to an address for the store, the system inserts the data for the store in the set of ordered records by merging the data for the store with the data from the previous store. In some embodiments, while inserting data for the store in the set of unordered records, if the unordered records include data for the address for the store from a previous store, the system inserts the data for the store in the set of unordered records by merging the data for the store with the data from the previous store.

In some embodiments, while updating the set of ordered records, if the store is a most recent store in the store queue for a cache line accessed by the store, the system: sends data for the store to be committed to memory, removes records for cache line from the set of ordered records, and releases the store-mark for the cache line for the store.

In some embodiments, the system receives a read-after-write (RAW) request for data for the store, and provides the data for the store to the RAW request using the set of unordered records.

In some embodiments, the system receives a request to release a cache line which is store-marked by the first thread. In some of these embodiments, the system releases the cache line which is store-marked by the first thread, wherein releasing the cache line involves using the set of ordered records to write data to the cache line.

In some embodiments, the system sets a flag for the set of unordered records, wherein the flag indicates that data for the cache line that is released is not forwarded using the set of unordered records.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Furthermore, the methods and processes described below can be included in hardware modules. For example, the hardware modules can include, but are not limited to, microprocessors, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The described embodiments include a processor that reorders stores from threads or processes executing on the processor. To accomplish this without violating a memory model such as total store ordering (TSO), the described embodiments assert (e.g., set) store-marks in cache lines to which data is to be stored. As long as the store-mark is set for a cache line, the described embodiments monitor the cache line to ensure that no interfering accesses occur. More specifically, these embodiments monitor a store-marked cache line to ensure that no other threads load data from or store data to the cache line.

In the described embodiments, a store-mark can be propagated to all levels of the memory hierarchy, including all caches and main memory to enable the described embodiments to keep track of store-marked cache lines. In addition, the processor can include one or more private buffers (interchangeably called "thread-level buffers for stores") that are used locally to keep track of the addresses of all cache lines for which a corresponding thread has set the store-mark.

In the described embodiments, because no other thread can access the cache line while the thread's store-mark is set, both consecutive and non-consecutive stores to the same byte(s) in the cache line can be merged into a single entry in the private buffer for the thread. Furthermore, separate stores directed to a same store-marked cache line (i.e., to two or more different bytes in the cache line) can also be merged into a single store in the private buffer for the thread.

Terminology

Throughout the description, we use the following terminology in describing embodiments of the present invention. These terms are generally known in the art, but are defined below to clarify the subsequent descriptions.

The term "store-mark" refers to an indicator for a cache line which is controlled by active threads in the computer system. When a store-mark for a cache line is set by a thread, the cache line is effectively locked by the thread, i.e., the system monitors the cache line to detect the occurrence of interfering memory accesses from other threads or processes. We will use the term "store-marked" to refer to the "set" state of a store-mark.

The term "forward progress" refers to the ability of a processor (or a thread executing on the processor) to continue performing computational operations. Forward progress can be halted when a thread cannot gain access to a computational resource (i.e., a hardware or software resource) that is needed to continue performing operations. For example, in some prior-art systems that store-mark cache lines, forward progress is halted when a thread cannot acquire a store-mark for a cache line because another thread has placed a store-mark on the cache line.

Throughout this description, we use the terms data-word and double-word (DW) interchangeably. Generally, a data-word can include any number of bits. For example, some embodiments can perform a store to a 32-bit data-word, whereas other implementations can perform a store to a 64-bit double-word. In addition, although we describe stores to "data-words" for clarity and brevity, some embodiments perform stores to individual bytes.

Computer System

Figure 1:
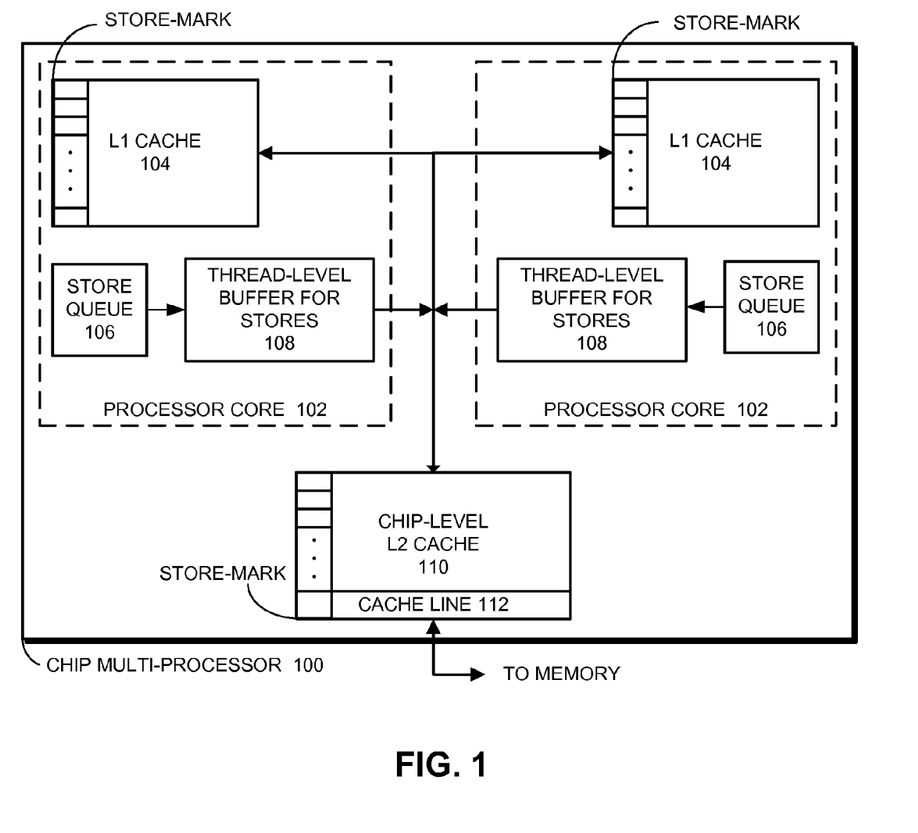
FIG. 1 illustrates an exemplary chip multi-processor (CMP) system in accordance with the described embodiments.

FIG. 1 illustrates an exemplary chip multi-processor (CMP) system 100 in accordance with an embodiment of the present invention. CMP system 100 is incorporated onto a single semiconductor die, and includes two processor cores 102.

Processor cores 102 each include an L1 data cache 104, and share L2 cache 110. Processor cores 102 also include store queues 106, which buffer pending stores which have not yet passed the trap stage. Once a pending store passes the trap stage, the pending store is maintained in a thread-level buffer for stores 108.

During a store operation, processor core 102 first performs a lookup for a corresponding cache line in L1 data cache 104. If the lookup generates a miss in L1 data cache 104 (or if store queue 106 is not empty), processor core 102 creates an entry for the store in store queue 106 and sends a corresponding request for the store to L2 cache 110.

During a subsequent load operation, processor core 102 performs a lookup into the thread-level buffer for stores 108 to locate completed but not-yet-retired stores to the same address that are logically earlier in program order. For each byte being read by the load operation, if such a matching store exists, the load operation obtains its value from the thread-level buffer for stores 108 rather than from the memory subsystem. This process is referred to as a read-after-write (RAW) bypass operation.

Each cache line in L1 data cache 104 and L2 cache 110 include a store-mark. This store-mark can be used to prevent conflicting memory references from taking place.

Thread-level buffer for stores 108 maintains thread-level state information for stores containing addresses for cache lines which have been store-marked by the thread. Hence, whenever a thread needs to load or store to a cache line, that thread first checks its private buffer to see if it has already set the store-mark for the cache line.

In the illustrated embodiments, thread-level buffer for stores 108 is shown as being separate from store queue 106. However, in other embodiments, store queue 106 can include some or all of thread-level buffer for stores 108. For example, in some embodiments store queue 106 and thread-level buffer for stores 108 share a program-order FIFO 200 (see FIG. 2). Also, although in the illustrated embodiments CMP 100 includes two processor cores, in other embodiments CMP 100 can include any number of processor cores. Note that in this description we use the terms "processor" and "processor core" interchangeably to refer to a processor core 102.

Thread-Level Buffer for Stores

Figure 2:
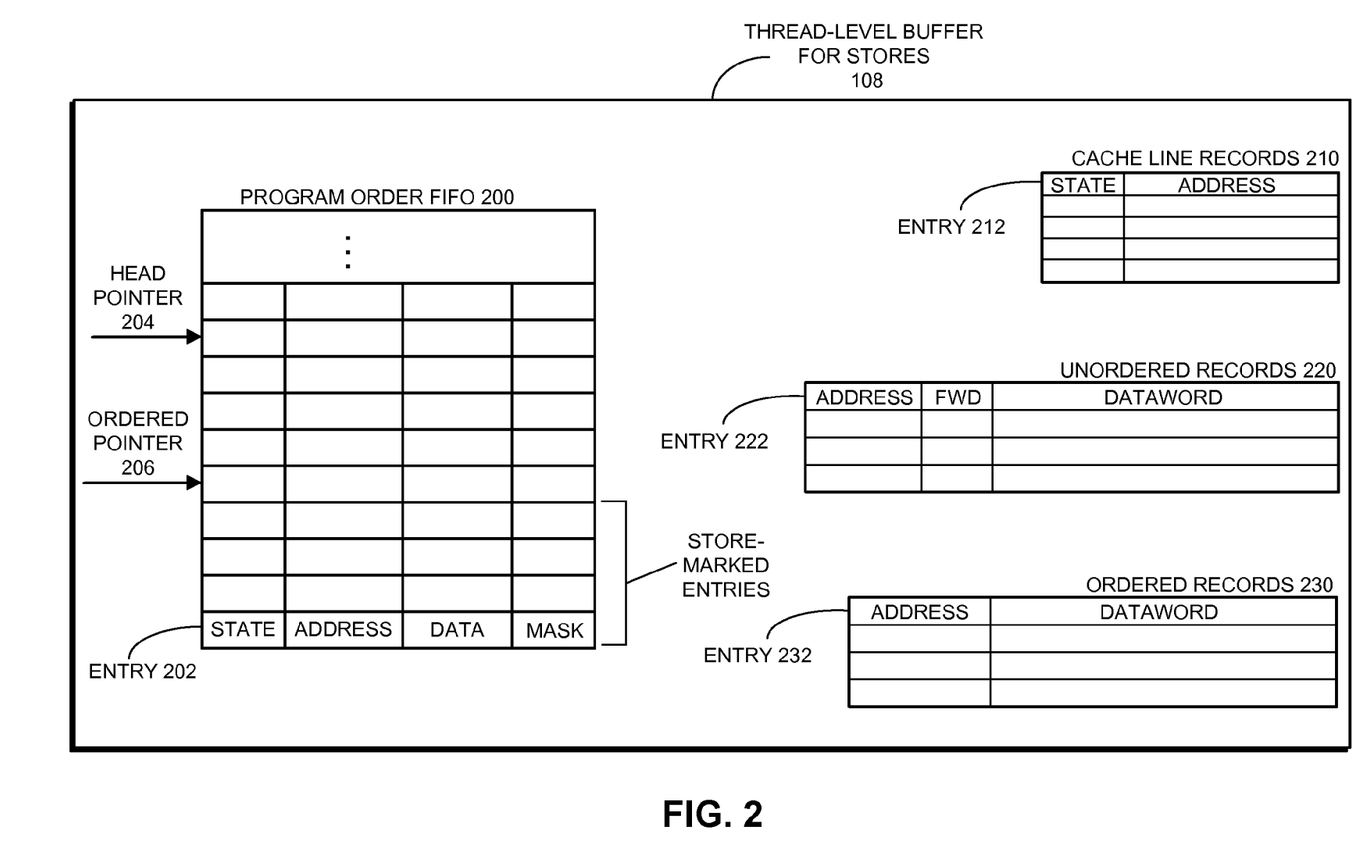
FIG. 2 illustrates a thread-level buffer for stores in accordance with the described embodiments.

FIG. 2 illustrates a thread-level buffer for stores 108 in accordance with the described embodiments. Each processor core 102 can include a thread-level buffer for stores 108, which stores information about stores for a thread that is executing on processor core 102.

Program-order FIFO (POFIFO) 200 holds pending stores for the thread in program order. Each entry 202 in POFIFO 200 includes an address for the store and data for the store, e.g., a data-word. Entry 202 can also include a state indicator, which indicates whether a store-mark has been obtained for the cache line associated with the store. In addition, entry 202 can include a byte-mask to indicate bytes in the data-word that are affected by the store, i.e., bytes in the data-word to which the store writes.

In the described embodiments, the stores in POFIFO 200 can include "ordered" stores and/or "unordered" stores. A store is ordered if: (1) a store-mark has been placed on the cache line accessed by the store, and (2) store-marks have been placed on cache lines accessed by all older stores in POFIFO 200. In contrast, an unordered store is a store that has not yet been ordered.

A head pointer 204 and ordered pointer 206 can be associated with POFIFO 200. Head pointer 204 points to the youngest store (i.e., the most recent entry) in POFIFO 200. Ordered pointer 206 points to the youngest unordered store. For example, assuming that POFIFO 200 fills upwards from the bottom, then, with reference to FIG. 2, all stores below ordered pointer 206 are ordered, i.e., cache lines that are accessed by the stores are store-marked.

As will become apparent in this description, thread-level buffer for stores 108 can be implemented without some of the lookup circuitry/mechanisms that can be required in similar structures in the prior art. Because thread-level buffer for stores 108 does not use some of these lookup structures, thread-level buffer for stores 108 can provide bounded-time responses to read-after-writes (RAW) bypass, and forward-progress requests for threads.

Cache line records 210 is a memory structure that includes a set of entries 212 that can each be used to keep a record of a cache line for which a store mark has been requested and/or obtained. During operation, processor 102 can perform lookups in cache line records 210 to determine if a given cache line has been store-marked. In the described embodiments, cache line records 210 is arranged to facilitate efficient lookups of cache lines. For example, cache line records 210 can be arranged as a content-addressable memory (CAM).

Each entry 212 in cache line records 210 includes an address field and a state field. When a record of a cache line is written to a given entry 212, the address field is used to store the address of the cache line and the state field is used to indicate the state and/or the progress of the store-mark request for a cache line associated with the entry (the state field is described in more detail later in this description). In some embodiments, each entry 212 can also include a byte-mask field that is used to keep a record of the bytes of the cache line that are to be written by the corresponding store.

Unordered records 220 is a memory structure that includes a set of entries 222 that can each hold a record of an unordered store. Unordered records 220 facilitates data forwarding for read-after-write (RAW) bypass requests. During operation, processor 102 can perform lookups in unordered records 220, and can forward data from unordered records 220 in response to RAW requests.

Each entry 222 in unordered records 220 includes an address field for a data-word (e.g., the address to which the store writes) and a data-word that includes data written by unordered stores corresponding to the address in the address field. Entry 222 can also include a flag (e.g., FWD flag), which can indicate whether some or all of the data-word for entry 222 can be forwarded to subsequent loads (e.g., forwarded to a RAW bypass request). Note that instead of a FWD flag for each entry 222, other embodiments can include a FWD flag for all entries in unordered records 220, i.e., a combined flag for all the unordered records.

In the described embodiments, a store can write to some or all of the data-word for an address (i.e., a store can write to any number of the bytes of the data-word—e.g., 1 or 2 bytes of an 8-byte data-word). Hence, entry 222 can include a byte-mask (not shown in FIG. 2) to indicate the bytes of the data-word that are to be written to by a given store (or a combination of one or more stores to the same data word). In the illustrated embodiments entry 222 includes a double-word, but can generally include a data-word of arbitrary length (e.g., the length of a cache line).

Ordered records 230 is a memory structure that includes a set of entries 232 for ordered stores. Ordered records 230 facilitates providing data in response to forward progress read-to-own (FPRTO) requests and writing data-words to memory (e.g., committing data-words for a store to the associated cache line). In the described embodiments, a thread can send a FPRTO request to a second thread that has store-marked a cache line to request that the second thread provide data for the cache line (which can enable the first thread to indicate to the second thread that the first thread is being blocked from completing a store to the cache line by the second thread's store mark). In response to the FPRTO request, the second thread can provide the data (e.g., commit the data to memory) and then release the store-mark for the cache line.

Each entry 232 in ordered records 230 includes an address field for a data-word accessed by an ordered store, and a data-word which includes data written by ordered stores corresponding to the address in the address field. Entry 232 can also include a byte-mask for the data-word for the ordered store.

Unordered and ordered stores to the same data-word can be merged within unordered records 220 and ordered records 230, respectively. More specifically, if a first store writes to some part of a data-word for an entry, and a subsequent store writes to another part of the data-word, the two stores can be merged by using the byte-mask for the entry (e.g., by logically-ORing the byte-masks for the two stores). If the subsequent store overlaps some or all of the data-word that was written-to by the first store, the subsequent store can over-write those parts in the entry. In other words, unordered records 220 and ordered records 230 can include one entry per data-word to which two or more stores have been merged.

Although not shown in FIG. 2, entries for cache line records 210, unordered records 220, and/or ordered records 230 can include a "youngest store" pointer, which points to the youngest store that accessed a cache line, and/or doubleword for the entry. This youngest store pointer indicates a location in POFIFO 200 of the most recent ("youngest") entry that contains a record for a store to the cache line, and/or double-word for the entry. One or more entries 212-232 can include the youngest store index.

As was described above, entry 202 and/or entry 212 can include a state indicator that indicates the state and/or the progress of the store-mark request for a cache line associated with the entry. In some embodiments, this state information can indicate whether a store-mark request for a cache line associated with the entry is: (1) not-sent, (2) sent-but-not-acknowledged, (3) obtained, or (4) failed-due-to-conflict. When the state field is set to "not-sent," a store-mark request has not yet been sent to the memory system for the corresponding store. When the state field is set to "sent-but-not-acknowledged," a store-mark request has been sent to the memory system for the corresponding store, but the memory system has not yet acknowledged setting the store-mark on the cache line to which the store is directed. When the state field is set to "obtained," a store-mark request for the corresponding store has been acknowledged by the memory system, indicating that a store-mark is set for the cache line to which the store is directed. When the state field is set to "failed-due-to-conflict," the store-mark request failed (i.e., was negatively acknowledged by the memory system). For example, a store-mark request can be negatively acknowledged by the system when another thread holds a store-mark on the cache line to which the store is directed.

Note that POFIFO 200 generally includes multiple entries for stores to the same address, and POFIFO 200 maintains these entries in program order. In other words, although processor 102 may receive stores that access the same address, processor 102 does not overwrite and/or merge entries in POFIFO 200. On the other hand, unordered records 220 (and/or ordered records 230) can include a single entry for each double-word, because stores can be merged in unordered records 220 (and/or ordered records 230).

Note that unordered records 220 and ordered records 230 are illustratively stored in separate lookup structures. In other embodiments, unordered records 220 and ordered records 230 can be stored in a combined lookup structure.

Merging Stores

The described embodiments can use a byte-mask to merge stores to the same address or cache line. As was discussed earlier, a byte-mask can indicate the bytes in the cache line (or data-word) that have been written-to by stores. For example, a byte-mask for an 8-byte double-word can include 8 bits, with each of the bits corresponding to a byte in the double-word. When a store writes to a given set of bytes in the double-word, processor 102 can set bits in the byte-mask to indicate the bytes to which the store writes data. If a later store writes to a different set of bytes in the double-word, processor 102 can merge data for the stores, and can set bits in the byte-mask to indicate the combined set of bytes written by each of the stores. In some embodiments, processor 102 can update the byte-mask for a merged store by logically ORing separate byte-masks for the two stores.

By using byte-masks, consecutive stores directed to the same data-word in a cache line can be merged into a single entry in the thread-level buffer for store 108. Note that the merged cache line contains the cumulative result of the multiple stores, which facilitates propagating a single merged store operation to the memory hierarchy instead of multiple separate store operations. In comparison to transferring each store to memory separately, transferring the merged/combined store to memory in a single operation can reduce the amount of bandwidth used to transfer the stores to memory.

Received Stores and Managing Unordered Records

Figure 3:
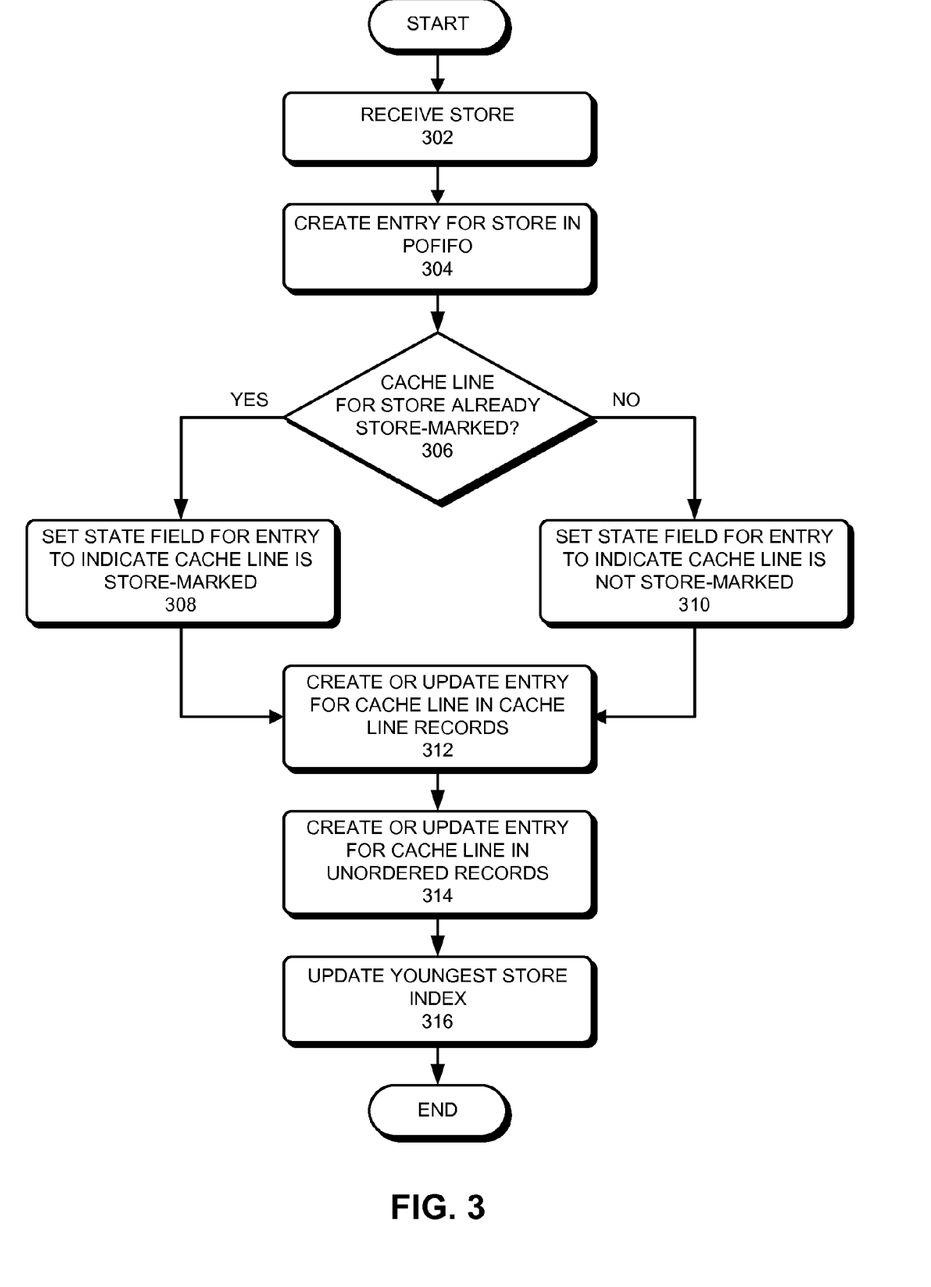
FIG. 3 presents a flowchart illustrating a process for receiving stores and managing unordered records in accordance with the described embodiments.

FIG. 3 presents a flowchart illustrating a process for receiving stores and managing unordered records in accordance with the described embodiments. The process shown in FIG. 3 starts when processor 102 receives a notification that a store directed to a given cache line is to be recorded in thread-level buffer for stores 108 (step 302). Next, processor 102 updates the next entry 202 in POFIFO 200 (as indicated by head pointer 204) to include a record of the store (step 304). In the described embodiments, updating the entry involves storing an address for the store and data for the store in the entry 202. In some embodiments, processor 102 also sets bits in a byte-mask for entry 202 to indicate bytes that are affected by the store.

Then, processor 102 determines if the cache line for the store has been store-marked by the thread (i.e., was previously store-marked for another store) (step 306). For example, processor 102 can perform a lookup in cache line records 210 using the address of the store to determine if the cache line records 210 include an address for a cache line associated with the store. If the lookup indicates that the cache line for the store is store-marked, processor 102 sets the state field for entry 202 to indicate that the cache line for the entry is store-marked, e.g., obtained (step 308). Otherwise, if the lookup indicates that the cache line for the store is not store-marked (e.g., a request for a store-mark has not been sent, or such a request has not been acknowledged), processor 102 sets the state field for entry 202 to indicate the cache line for the store is not store-marked (step 310).

Next, processor 312 updates (or creates, if one does not exist) an entry for the cache line for the store in cache line records 210 (step 312). More specifically, if the cache line records 210 do not include an entry for the cache line, processor 102 can send a request to store-mark the cache line, and can create an entry 212 to indicate a request for a store-mark is pending. Also, if entry 212 includes a byte-mask, while updating (or creating) entry 212, processor 102 can update or set the byte-mask to indicate the bytes in the cache line that are affected by the store. For example, while updating an existing entry 212, processor 102 can merge a byte-mask for the store with the byte-mask for entry 212 (the byte-mask for previous store(s)).

Then, processor 102 updates (or creates, if one did not exist) an entry for the cache line in unordered records 220 (step 314). More specifically, if unordered records 220 include an entry 222 for an address associated with a data-word for the store, processor 102 can update entry 222 by merging the data-word for the store with the data-word for entry 222. Processor 102 can update a byte-mask for entry 222 to indicate the bytes written to by the merged stores. Note that if an entry for the store does not exist, processor 102 can allocate (i.e., create) a new entry 222 in unordered records 220, and can store the address, data-word, and byte-mask for the store in entry 222.

Next, processor 102 updates (or creates, if one not did not exist) the youngest store index (for the cache line, and/or data-word address) to indicate that the store is the youngest store for the cache line and/or data-word address (step 316). This youngest store index can be associated with entry 212 for the store, or entry 222 for the store.

Note that although FIG. 3 illustrates steps of a process in a particular order, in other embodiments, the order of these steps may be different. For example, in some embodiments, processor 102 first performs the lookup using cache line records 210, and then creates an entry in POFIFO 200.

Processing Acknowledgements from Store-Mark Requests

Figure 4:
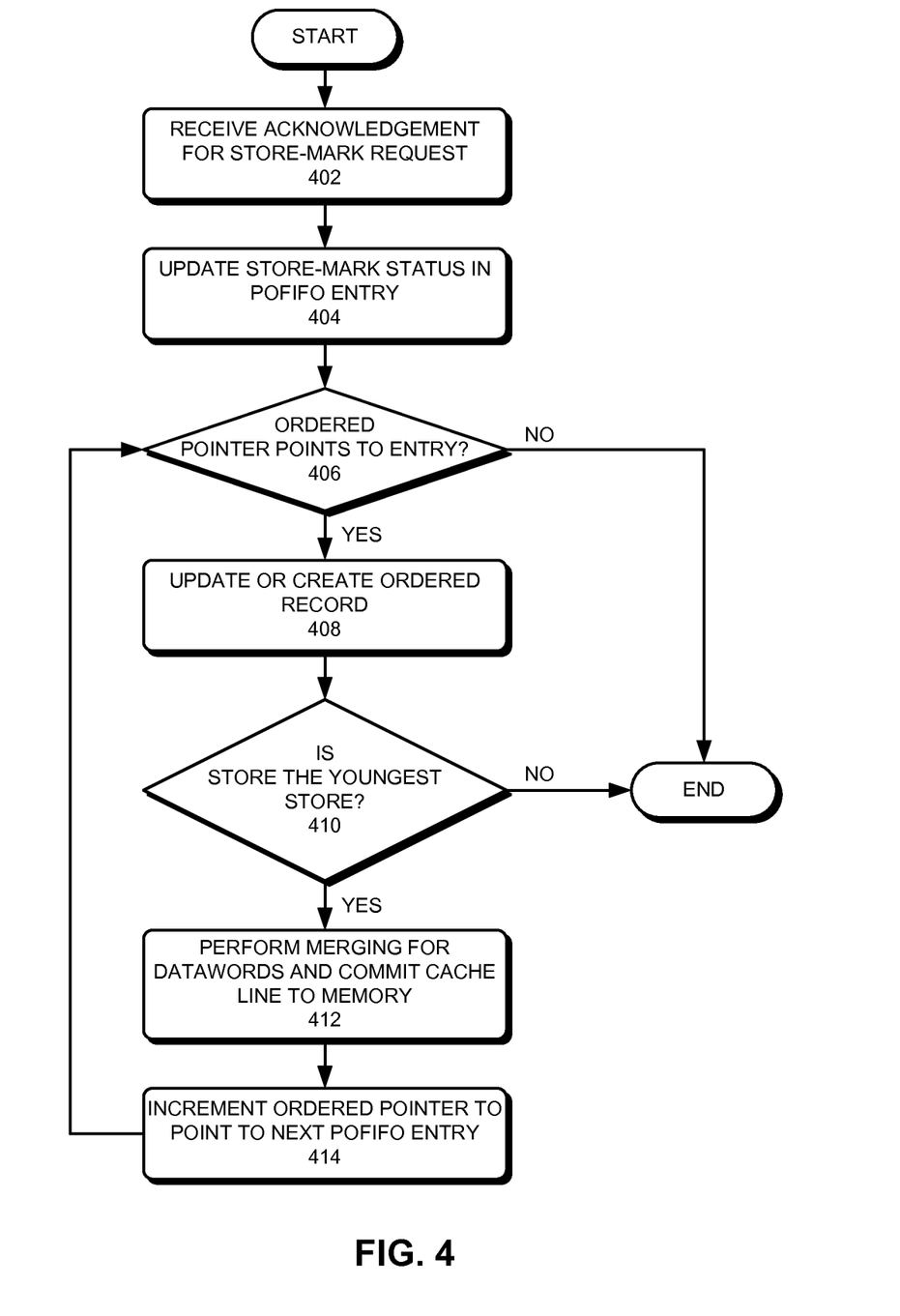
FIG. 4 presents a flowchart illustrating a process for processing acknowledgements from store-mark requests in accordance with the described embodiments.

FIG. 4 presents a flowchart illustrating a process for processing acknowledgements from store-mark requests in accordance with the described embodiments. During operation, the system keeps track of store-mark requests for each thread using POFIFO 200. Because the memory system may take variable amounts of time to process these store-mark requests, the store-mark requests can possibly return out of order.

The process begins when processor 102 receives an acknowledgement for a store-mark request (step 402). The system then looks up the corresponding POFIFO entry for the request and updates the state field in the entry for the store-mark request (step 404).

Next, the system determines whether the ordered pointer points to the entry for the acknowledgement in the POFIFO (step 406). If not, e.g., if the ordered pointer points to an earlier store because store-marks requests for earlier stores have not yet been acknowledged, the process ends.

Otherwise, if the ordered pointer points to the entry for the acknowledgement, processor 102 updates (or creates, if one does not exist) an ordered record for the store (for which the acknowledgement was received) in ordered records 230 (step 408). As was described earlier processor 102 can merge the data-word for the store with previous stores to the data-word in ordered records 230, e.g., by using a byte-mask for an entry 232 associated with the store.

When processor 102 updates (or creates) an ordered record, the corresponding cache line can be committed to memory when there exist no younger stores for the data-word accessed by the store and/or the cache line accessed by the store. More specifically, processor 102 determines if the store is the youngest store to the data-word and/or the cache line accessed by the store (step 410). For example, processor 102 can use a youngest store index associated with a data-word and/or cache line for the store to determine if the youngest store index points to the POFIFO entry that was acknowledged. If the store is not the youngest store, the process ends (step 410, No).

Otherwise, if the store is the youngest store (step 410, Yes), processor 102 merges data-words associated with the store, and commits the cache line accessed by the store to memory (step 412). In some embodiments, after the cache line is committed to memory, stores associated with the cache line can be removed from the thread-level buffer for stores.

Note that processor 102 can merge data-words from two or more ordered entries corresponding to the cache line before committing the cache line to memory. More specifically, the cache line accessed by the store can include two or more data-words, and, before committing the cache line to memory, processor 102 can merge these data-words to form a complete cache line. Processor 102 can use byte-masks for the data-words to merge the data-words.

Also note that when processor 102 orders a store for a data-word, if there exist no younger stores to the data-word, processor 102 can use the non-ordered record as the ordered record for the data-word. In other words, processor 102 need not create an ordered record for a data-word if the current record is the youngest. For example, with reference to FIG. 4B, if the store is the youngest store and there are no younger stores to the data-word in the POFIFO (step 418, yes), processor 102 can use the unordered record for the store to commit the cache line to memory (step 420). In other words, data from the unordered record for the store can be written to memory, without first creating an ordered record. If the store is not the youngest store, or if younger stores exist in the POFIFO to the data-word, processor 102 updates (or creates) an ordered record (step 408). (Note that the remaining steps of the process shown in FIG. 4B correspond to the steps shown in FIG. 4 that use the same reference number, and therefore the description of those steps is not repeated here).

Figure 4B:
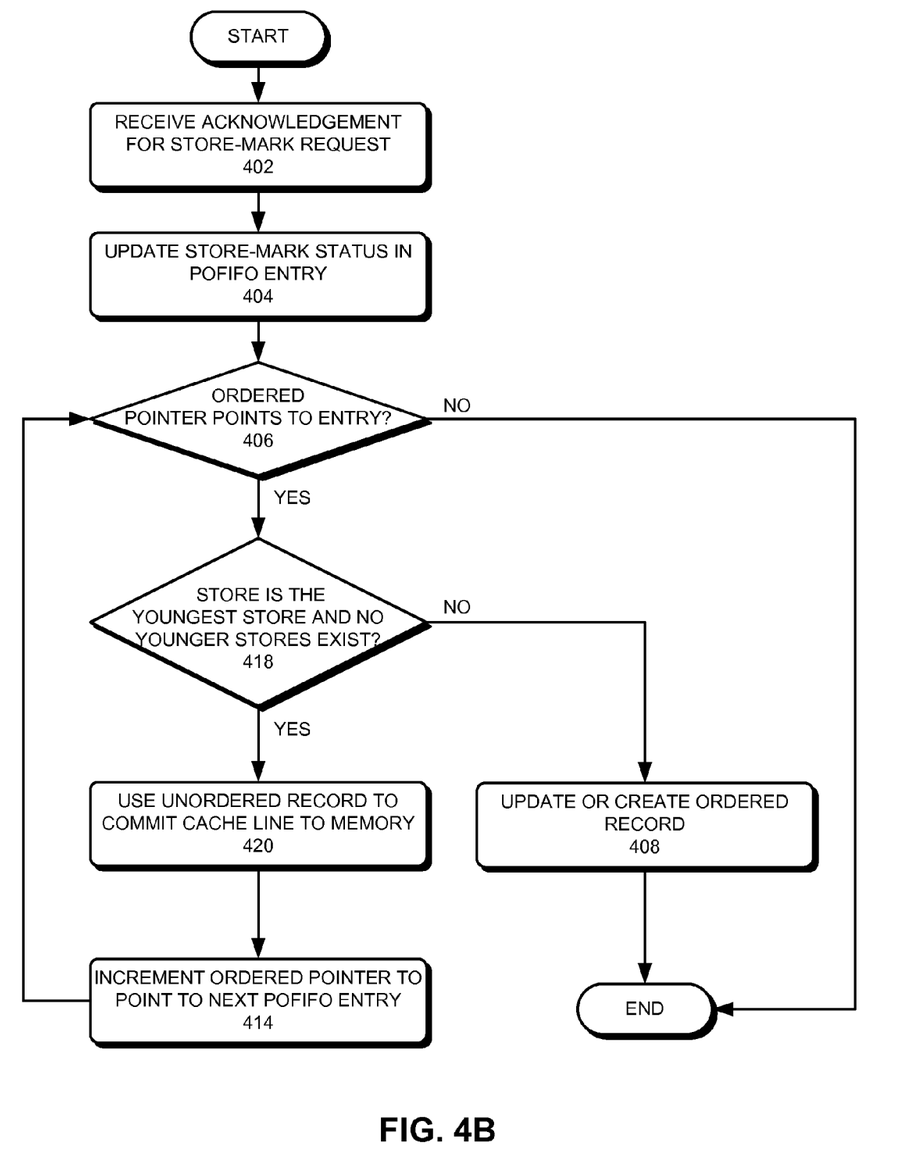
FIG. 4B presents a flowchart illustrating a second process for processing acknowledgements from store-mark requests in accordance with the described embodiments.

Next, processor 102 increments the ordered pointer to point to the next entry in the POFIFO (step 414). The process then continues to step 406.

In some embodiments, when the system determines that the ordered pointer points to the entry for the acknowledgement (step 406), the system can also determine that one or more younger entries in the POFIFO have been previously acknowledged. For example, the ordered pointer can point to an entry for which an acknowledgement for a store-mark request was received after receiving acknowledgements for younger entries. In other words, the acknowledgment requests can be received out-of-order.

Embodiments that receive acknowledgement requests out-of-order can update (or create) ordered records for each of the consecutive entries in the POFIFO for which a store-mark request has been acknowledged. These embodiments advance the ordered pointer by stepping-through the consecutive entries in the POFIFO until reaching the youngest entry for which the corresponding cache line is not store-marked, and can update/create an ordered record for each of the acknowledged entries. In other words, in some embodiments the ordered pointer can move independently of when an acknowledgement for a store-mark request is received.

Providing Data for a Read-after-Write (RAW) Bypassing Request

Figure 5:
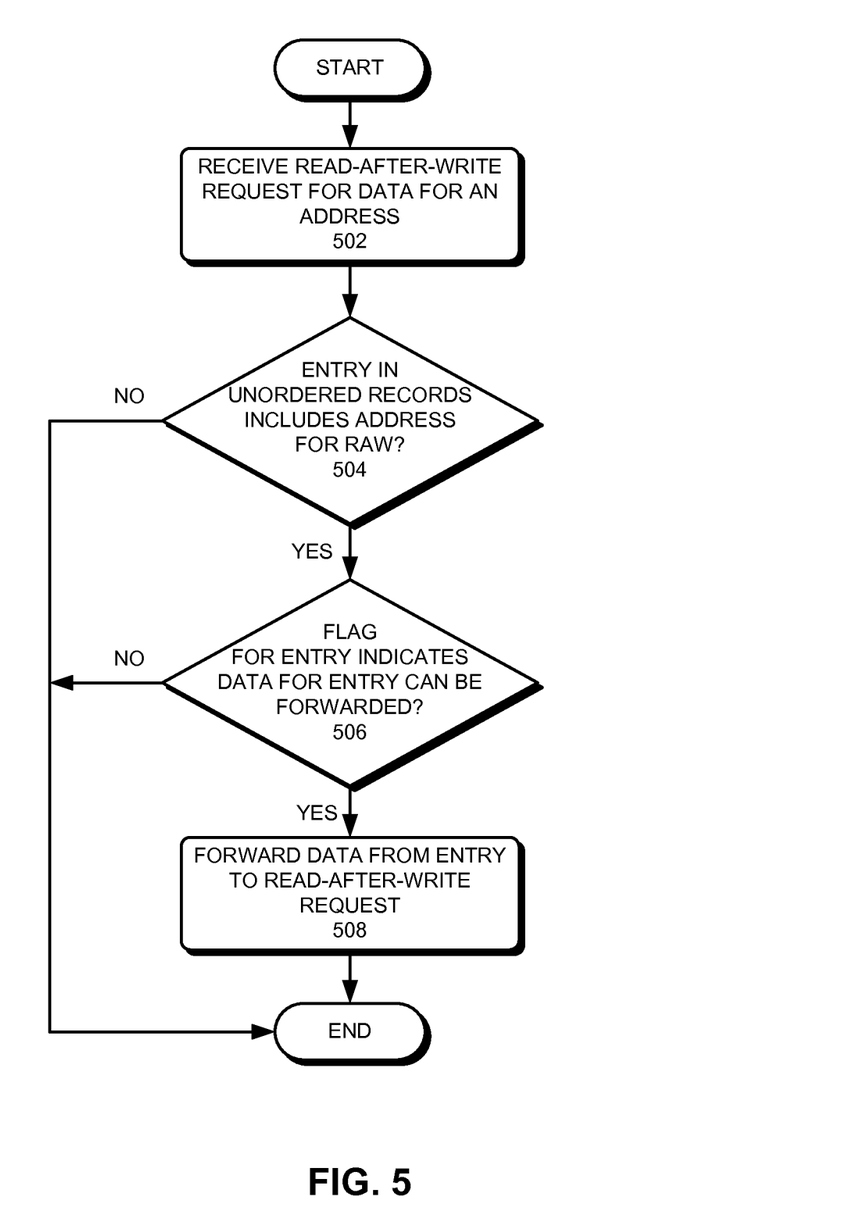
FIG. 5 presents a flowchart illustrating a process for responding to read-after-write (RAW) requests in accordance with the described embodiments.

FIG. 5 presents a flowchart illustrating a process for responding to read-after-write (RAW) requests in accordance with the described embodiments. In the described embodiments, processor 102 can provide data for a RAW requests using unordered records 220.

First, processor 102 receives a RAW request for data (step 502). Then, processor 102 performs a lookup in the unordered records to determine if the unordered records include one or more addresses accessed by the RAW request (step 504). If the unordered records do not include the address for the RAW request (step 504, No), the process ends.

Otherwise, if the unordered records include one or more address for the RAW request (step 504, Yes), processor 102 determines if the FWD flag for the entries corresponding to the address (or the combined FWD flag for the unordered records) indicates the entries are "forwardable" (i.e., data-words in the entries can be forwarded, step 506). If the FWD flag indicates that the data-words can be forwarded, processor 102 forwards the data-words to be used for the RAW request (step 508). Otherwise, processor 102 does not forward the data-words. Note that any non-forwardable (i.e., non-bypassable) unordered record can be removed as soon as all stores to the given double-word are ordered. At that point the record can be used again for RAW bypasses.

Responding to a Forward Progress Read-to-Own Request

Figure 6:
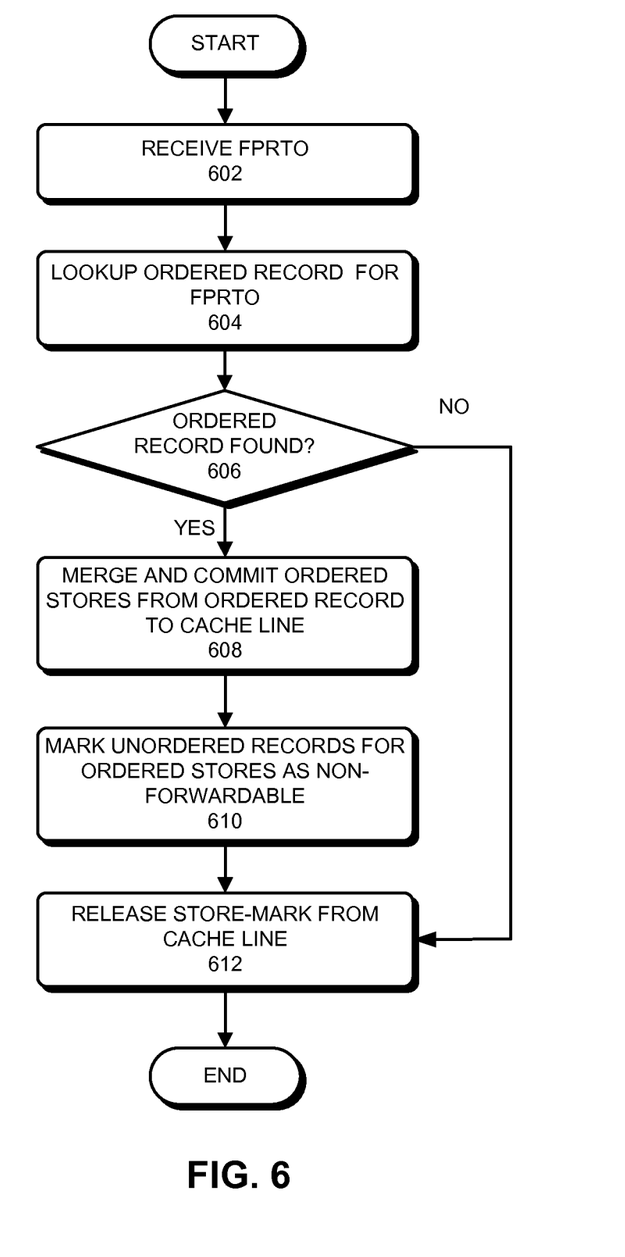
FIG. 6 presents a flowchart illustrating a process for responding to forward progress read-to-own (FPRTO) requests in accordance with the described embodiments.

FIG. 6 presents a flowchart illustrating a process for responding to forward progress read-to-own (FPRTO) requests in accordance with the described embodiments. An FPRTO is similar to a standard read-to-own (RTO) cache-coherence operation. In particular, the FPRTO can use the same coherence mechanisms (such as cache-coherence directories) that are used to implement a standard RTO. However, there are differences in the way the FPRTO is processed by a holder of a cache line to which the FPRTO is directed. Processor 102 can handle (e.g., provide data for) FPRTO requests using ordered records 230.

First, processor 102 receives an FPRTO for a cache line through the memory system (step 602). Typically, a requesting thread on another processor sends the FPRTO to the memory system and coherence circuitry in the memory system directs the FPRTO to the thread that holds the store-mark on the associated cache line. After receiving the FPRTO, processor 102 performs a lookup to determine if the ordered records 230 include one or more entries associated with the cache line (step 604). If no ordered records exist (step 606, No), processor 102 releases the store mark from the cache line (step 612).

If one or more ordered records exist (step 606, Yes), for each ordered record, the system performs a data-merging operation to commit ordered stores from the ordered record to the cache line (step 608), so that the entire cache line can be committed to memory. (This data merging operating is similar to the data merging operation described earlier with reference to committing ordered records to memory after receiving an acknowledgement for a store-mark request.)

Next, the system determines if unordered records 220 include one or more entries for addresses associated with the cache line for the FPRTO request. If one or more records exist, processor 102 sets a flag for each entry to indicate that the entry is non-forwardable (step 610). As was described earlier, setting this flag prevents data from the entries from being forwarded to subsequent RAW bypass requests. Note that for other embodiments that include a combined FWD flag for the unordered records, in step 610 the processor can set this combined FWD flag to indicate the entries in the unordered records are non-forwardable.

In some embodiments, when setting a FWD flag for an entry in unordered records 220 (or a combined FWD flag for the unordered records), processor 102 also blocks subsequent stores from entering POFIFO 200. Processor 102 can block all stores (i.e., stores to any address) from entering the POFIFO. In some embodiments processor 102 blocks only some stores from entering POFIFO 200, e.g., stores to the cache line accessed by the non-forwardable entries.

Note that while blocking stores from entering POFIFO 200, the described embodiments do not require a mechanism to clear the FWD flags in the unordered records. This blocking can "self-heal" as ordered pointer 206 advances through entries in POFIFO 200. More specifically, a flag indicating that one or more unordered records are non-forwardable can be removed as soon as all stores to the double-word for those records are ordered. At that point, the unordered records can be used for RAW bypasses.

The thread then releases the store-mark for the cache line (step 612). Note that after that thread releases the store-mark for the cache line, another thread (e.g., the thread that sent the FPRTO request) can store-mark the cache line and make progress.

CONCLUSION

The described embodiments can provide bounded-time responses to RAW bypasses (including multi-RAW bypasses in which data is bypassed from multiple stores to a single load), and to foreign forward-progress coherence requests (such as FPRTOs).

This can be accomplished by maintaining a program-order FIFO (POFIFO) for stores which includes 1 record per store, a cache line record which includes the state of a store-mark request, and both "ordered" and "unordered" double-word records. Ordered double-word records can include the values of all ordered stores within the store queue to the given double-word, while unordered double-word records can include the values of all stores within the store queue to the given double-word. The store queue can use the ordered records for providing copyback responses to forward-progress coherence requests, while it can use the unordered records for providing RAW bypasses to loads.

In the described embodiments, an ordered pointer traverses the POFIFO in program order and increments whenever it points to an entry for which a store-mark has been obtained. Whenever the ordered pointer increments past a POFIFO record for a store S, the described embodiments update (or create) an ordered double-word record which includes store S. In the special case where S is the youngest store and the oldest store to the given double-word (i.e., S is the only store to the double-word), this ordered double-word record can be obtained by copying (or changing the status of) the corresponding unordered double-word record.

Whenever a forward-progress coherence request is received, the store-mark can be removed, and data from all ordered double-word records for the given cache line can be applied to the line before it is copied back. These ordered double-word records can be removed from the store queue and any corresponding unordered records for the same double-words can be marked as being non-bypassable (i.e., non-forwardable), as they can provide stale data for RAW bypasses. Any non-bypassable unordered record can be removed as soon as all stores to the given double-word are ordered. At that point the record can be used again for RAW bypasses.

In other words, the described embodiments can provide data for RAW bypass requests, and FPRTO requests without traversing a list of stores. Hence, the described embodiments can provide constant time responses to these requests, while maintaining the TSO memory model.

In the foregoing descriptions of embodiments, one or more flowcharts have included a series of steps for a corresponding process. Although these flowcharts indicate a particular sequence of steps, in other embodiments processor 102 can execute these steps in a different order/sequence.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing a store in a memory system, comprising:
  receiving a store for a first thread;
  creating an entry for the store in a store queue for the first thread, wherein creating the entry involves requesting a store-mark for a cache line for the store, wherein the store-mark indicates that one or more store queue entries are waiting to be committed to the cache line;
  receiving a response to the request for the store-mark, wherein the response indicates that the cache line is store-marked;
  upon receiving the response to the request for the store-mark, updating a set of ordered records for the first thread by inserting data for the store in the set of ordered records, wherein the set of ordered records include one or more store-marked stores for the first thread; and
  upon receiving a request to release the cache line, setting a flag for an unordered record for the cache line that comprises data for the cache line, wherein the flag indicates that, while the data remains in the unordered record and the flag is set, the data is not forwarded to a subsequent read-after-write request using the unordered record.

2. The method of claim 1, wherein while creating the entry for the store in the store queue, if the cache line is not store-marked, the method further comprises updating the unordered record by inserting the data for the store in the unordered record, wherein the unordered record includes one or more stores for the first thread for which a corresponding cache line is not store-marked.

3. The method of claim 2, wherein while inserting the data for the store in the set of ordered records, if the ordered records include data from a previous store corresponding to an address for the store, inserting the data for the store in the set of ordered records involves merging the data for the store with the data from the previous store; and wherein while inserting the data for the store in the unordered record, if the unordered record includes data from a previous store corresponding to an address for the store, inserting the data for the store in the unordered record involves merging the data for the store with the data from the previous store.

4. The method of claim 1, wherein upon updating the set of ordered records, if the store is a most recent store for the cache line in the store queue, the method further comprises:

sending data for the cache line to be committed to memory;
removing records the cache line from the set of ordered records; and
releasing the store-mark for the cache line.

5. The method of claim 1, further comprising receiving a read-after-write (RAW) request for data for the store; and
when the flag is not set, providing the data for the store to the RAW request using the unordered record.

6. The method of claim 1, further comprising releasing the cache line by writing data to the cache line.

7. The method of claim 6, wherein writing the data to the cache line comprises using the data for the store in the ordered record.

8. The method of claim 1, further comprising:
receiving a read-after-write (RAW) request for the data for the store;
if the flag is not set, providing the data for the store to the RAW request using the unordered record; and
otherwise, if the flag is set, not providing the data for the store to the RAW request.

9. A processor that facilitates store-marking while performing a store in a memory system, comprising:
the processor configured to execute threads;
a store queue configured to buffer pending stores which are waiting to be committed to the memory system, wherein the store queue is configured to:
receive a store for a first thread, wherein responsive to receiving the store the store queue is configured to create an entry for the store and to request a store-mark for a cache line for the store, wherein the store-mark indicates that one or more store queue entries are waiting to be committed to the cache line;
receive a response to the request for the store-mark, wherein the response indicates that the cache line is store-marked;
responsive to receiving the response to the request for the store-mark, update a set of ordered records for the first thread by inserting data for the store in the set of ordered records, wherein the set of ordered records include one or more store-marked stores for the first thread; and
responsive to receiving a request to release the cache line, set a flag for an unordered record for the cache line that comprises data for the cache line, wherein the flag indicates that, while the data remains in the unordered record and the flag is set, the data is not forwarded to a subsequent read-after-write request using the unordered record.

10. The processor of claim 9, wherein while creating the entry for the store, if the cache line is not store-marked, the store queue is further configured to update the unordered record by inserting the data for the store in the unordered record, wherein the unordered record includes one or more stores for the first thread for which a corresponding cache line is not store-marked.

11. The processor of claim 10, wherein while inserting the data for the store in the set of ordered records, if the ordered records include data from a previous store corresponding to an address for the store, the store queue is further configured to insert the data for the store in the set of ordered records by merging the data for the store with the data from the previous store; and wherein while inserting the data for the store in the unordered record, if the unordered record includes data from a previous store corresponding to an address for the store, the store queue is configured to insert the data for the store in the unordered record by merging the data for the store with the data from the previous store.

12. The processor of claim 9, wherein while updating the set of ordered records, if the store is a most recent store for the cache line in the store queue, the store queue is further configured to:

send data for the cache line to be committed to memory;
remove records the cache line from the set of ordered records; and
release the store-mark for the cache line.

13. The processor of claim 9, wherein the store queue is further configured to:
receive a read-after-write (RAW) request for data for the store; and
when the flag is not set, provide the data for the store responsive to the RAW request using the unordered record.

14. A computer system that facilitates store-marking while performing a store in a memory system, comprising:
a processor configured to execute code for threads;
memory coupled to the processor;
a store queue configured to buffer pending stores which are waiting to be committed to the memory system, wherein the store queue is configured to:
receive a store for a first thread, wherein responsive to receiving the store the store queue is configured to create an entry for the store and to request a store-mark for a cache line for the store, wherein the store-mark indicates that one or more store queue entries are waiting to be committed to the cache line;
receive a response to the request for the store-mark, wherein the response indicates that the cache line is store-marked;
responsive to receiving the response to the request for the store-mark, update a set of ordered records for the first thread by inserting data for the store in the set of ordered records, wherein the set of ordered records include one or more store-marked stores for the first thread; and
responsive to receiving a request to release the cache line, set a flag for an unordered record for the cache line that comprises data for the cache line, wherein the flag indicates that, while the data remains in the unordered record and the flag is set, the data is not forwarded to a subsequent read-after-write request using the unordered record.

15. The computer system of claim 14, wherein while creating the entry for the store, if the cache line is not store-marked, the store queue is further configured to update the unordered record by inserting the data for the store in the unordered record, wherein the unordered record includes one or more stores for the first thread for which a corresponding cache line is not store-marked.

16. The computer system of claim 15, wherein while inserting the data for the store in the set of ordered records, if the ordered records include data from a previous store corresponding to an address for the store, the store queue is further configured to insert the data for the store in the set of ordered records by merging the data for the store with the data from the previous store; and wherein while inserting the data for the store in the unordered record, if the unordered record includes data from a previous store corresponding to an address for the store, the store queue is configured to insert the data for the store in the unordered record by merging the data for the store with the data from the previous store.

17. The computer system of claim 14, wherein while updating the set of ordered records, if the store is a most recent store for the cache line in the store queue, the store queue is further configured to:

send data for the cache line to be committed to memory;

remove records the cache line from the set of ordered records; and release the store-mark for the cache line.

18. The computer system of claim 14, wherein the store queue is further configured to:

receive a read-after-write (RAW) request for data for the store; and when the flag is not set, provide the data for the store responsive to the RAW request using the unordered record.

\* \* \* \* \*

UNITED STATES PATENT AND TRADEMARK OFFICE
CERTIFICATE OF CORRECTION

PATENT NO.         : 8,756,374 B2                              Page 1 of 1
APPLICATION NO.    : 12/940929
DATED              : June 17, 2014
INVENTOR(S)        : Cypher et al.

It is certified that error appears in the above-identified patent and that said Letters Patent is hereby corrected as shown below:

In the Claims

Column 13, line 25, in Claim 4, after "records" insert -- for --.

Column 13, line 51, in Claim 9, after "the store" delete "the store".

Column 14, line 32, in Claim 12, after "records" insert -- for --.

Column 14, line 50, in Claim 14, after "the store" delete "the store".

Column 16, line 10, in Claim 17, after "records" insert -- for --.

Signed and Sealed this
Tenth Day of February, 2015

Michelle K. Lee
*Deputy Director of the United States Patent and Trademark Office*